(12) United States Patent
Liu et al.

(10) Patent No.: US 11,891,550 B2
(45) Date of Patent: Feb. 6, 2024

(54) CURABLE AND OPTICALLY CLEAR PRESSURE SENSITIVE ADHESIVES AND USES THEREOF

(71) Applicant: HENKEL AG & CO. KGaA, Duesseldorf (DE)

(72) Inventors: Yuxia Liu, Dayton, NJ (US); Matthew Ahearn, Jersey City, NJ (US)

(73) Assignee: HENKEL AG & CO. KGaA, Duesseldorf (DE)

( * ) Notice: Subject to any disclaimer, the term of this patent is extended or adjusted under 35 U.S.C. 154(b) by 0 days.

(21) Appl. No.: 17/215,397

(22) Filed: Mar. 29, 2021

(65) Prior Publication Data

US 2021/0214585 A1    Jul. 15, 2021

Related U.S. Application Data

(60) Division of application No. 15/924,491, filed on Mar. 19, 2018, now Pat. No. 10,988,642, which is a
(Continued)

(51) Int. Cl.
| | |
|---|---|
| *C09J 7/38* | (2018.01) |
| *C09J 183/10* | (2006.01) |
| *C08G 77/44* | (2006.01) |
| *C08K 5/00* | (2006.01) |
| *C08L 83/00* | (2006.01) |

(Continued)

(52) U.S. Cl.
CPC .............. *C09J 7/38* (2018.01); *C08G 77/44* (2013.01); *C08K 5/0025* (2013.01); *C08L 83/00* (2013.01); *C09J 5/06* (2013.01); *C09J 183/10* (2013.01); *C08G 77/20* (2013.01);
(Continued)

(58) Field of Classification Search
CPC ..... C09J 7/38; C09J 5/06; C09J 183/10; C09J 2203/326; C09J 2301/416; C09J 2483/00; C09J 2301/302; C08G 77/44; C08G 77/20; C08K 5/0025; C08L 83/00; Y02P 20/582

See application file for complete search history.

(56) References Cited

U.S. PATENT DOCUMENTS

| | | |
|---|---|---|
| 5,262,468 A | 11/1993 | Chen |
| 5,300,608 A | 4/1994 | Chu et al. |

(Continued)

FOREIGN PATENT DOCUMENTS

| | | |
|---|---|---|
| CN | 103820042 A | 5/2014 |
| CN | 104130740 A | 11/2014 |

(Continued)

OTHER PUBLICATIONS

Dean, John A. "11.2 Drying and Humidification." Lange's Handbook of Chemistry, McGraw-Hill, Inc., 1999, p. 11.5.
(Continued)

*Primary Examiner* — Christopher W Raimund
(74) *Attorney, Agent, or Firm* — Sun Hee Lehmann (57) ABSTRACT

Curable silicone pressure sensitive adhesive compositions and films suitable for sealing and adhering substrates for optically clear electronic devices are described. The curable silicone pressure sensitive adhesive compositions are suitable as films or encapsulants for adhering electronic devices, e.g., LCD display, LED display, flexible display, touch screen, and flexible thin film photovoltaic module.

4 Claims, 1 Drawing Sheet

Related U.S. Application Data continuation of application No. PCT/US2016/051825, filed on Sep. 15, 2016.

(60) Provisional application No. 62/220,411, filed on Sep. 18, 2015.

(51) Int. Cl.
*C09J 5/06* (2006.01)
*C08G 77/20* (2006.01)

(52) U.S. Cl.
CPC .... *C09J 2203/326* (2013.01); *C09J 2301/416* (2020.08); *C09J 2483/00* (2013.01); *Y02P 20/582* (2015.11)

(56) References Cited

U.S. PATENT DOCUMENTS

| | | | |
|---|---|---|---|
| 5,308,887 A | 5/1994 | Ko et al. | |
| 5,362,781 A | 11/1994 | Stein | |
| 5,559,165 A | 9/1996 | Paul | |
| 5,901,523 A | 5/1999 | Tasi | |
| 6,448,303 B1 | 9/2002 | Paul | |
| 6,730,397 B2 | 5/2004 | Melancon et al. | |
| 6,828,355 B1* | 12/2004 | Chu ................ | C09J 183/04 525/445 |
| 8,178,207 B2 | 5/2012 | Mizuno et al. | |
| 8,580,891 B2 | 11/2013 | Liu et al. | |
| 8,754,174 B2 | 6/2014 | Aoki | |
| 2009/0306307 A1 | 12/2009 | Ahn et al. | |
| 2012/0040180 A1 | 2/2012 | Husemann et al. | |
| 2012/0045635 A1* | 2/2012 | Aoki ................ | C08L 83/00 525/100 |
| 2012/0095159 A1 | 4/2012 | Liu et al. | |
| 2012/0114737 A1 | 5/2012 | Loubert et al. | |
| 2015/0225614 A1 | 8/2015 | Kim et al. | |

FOREIGN PATENT DOCUMENTS

| | | |
|---|---|---|
| EP | 0175562 A2 | 3/1986 |
| JP | 2008-156497 A | 7/2008 |
| JP | 2012-041505 A | 3/2012 |
| JP | 2012057065 A | 3/2012 |
| WO | 2000031203 A1 | 6/2000 |
| WO | 2009148722 A2 | 12/2009 |
| WO | 2010124187 A2 | 10/2010 |
| WO | 2011062932 A1 | 5/2011 |
| WO | 2013173976 A1 | 11/2013 |
| WO | 2014093093 A1 | 6/2014 |
| WO | 2014124364 A1 | 8/2014 |

OTHER PUBLICATIONS

Fouassier, Jean-Pierre, "Photoinitiation, Photopolymerization and Photocuring: Fundamentals and Applications," Hanser Publishers, 1995.

Qi, Yusong et al. "Synthesis and Properties of Ultraviolet/Moisture Dual-Curable Polysiloxane Acrylates" Journal of Applied Polymer Science, vol. 96, 2005, pp. 846-853, Wiley Periodicals, Inc.

* cited by examiner

CURABLE AND OPTICALLY CLEAR PRESSURE SENSITIVE ADHESIVES AND USES THEREOF

FIELD OF THE INVENTION

The invention relates to curable, optically clear, pressure sensitive adhesives. The optically clear adhesives are suitable as films, laminants, tapes or encapsulants for adhering electronic devices, e.g., LCD display, LED display, flexible and foldable display, touch screen, and flexible thin film photovoltaic module.

BACKGROUND OF THE INVENTION

Electronic devices and circuits generally made of an active layer in between a cover front sheet and a substrate back sheet. At least one of the sheets is optically transparent. The substrate and cover sheets are adhered together with a laminating adhesive film that enhances light transmission and optical clarity. Desirably, the adhesive maintains adhesion for the substrates in a wide range of temperatures.

Adhesives in the form of laminating films improve handleability over liquid-based adhesive; however, there are several drawbacks to film-based adhesive. Films have poor substrate wet-out and poor void filling during the assembly process, and this problem is exacerbated for substrates that contain indentations and cavities created by components on substrates such as, electrodes, bus bars, ink steps, and integrated circuits.

WO2009148722 and WO2011062932 references describe polyisobutylene-based film adhesives with a relatively high viscosity. In order to obtain a better wet out, the film adhesive is applied onto the substrate under hot lamination. However, many active organic and electronic components are sensitive to heat above 60° C., and prolonged exposure to such high heat results in detrimental effects on the electronic components.

JP2012057065 reference discloses non-curable pressure sensitive adhesive films. In order to properly wet-out the substrates and to minimize void formations, the viscosity of the adhesive film is kept below 1,000,000 cps or below 200,000 g/mol viscosity average molecular weight (Mv) at 120° C.; however, the uncured thermal plastic adhesive exhibits cold flow under strain during the lifetime of the device. Similarly, CN104130740 reference teaches an organosilicone pressure sensitive adhesive film with high stripping force. Again, the film is not UV-curable, and exhibits cold flow under stain during the lifetime of the device.

CN 103820042 reference discloses the use of SIS and SBS block copolymer to make a film-based, heat-curable, hot melt adhesive for thermal-melt optical clear adhesive (TOCA). The unsaturated C=C functional bonds in the soft block of SIS and SBS block copolymer readily oxidizes in air under UV light or at elevated temperature, and the adhesive film discolors to yellow or brown over time, compromising optical clarity.

WO2013173976A1 reference discloses another challenge known as "Mura" for optical devices. Mura is defined as appearance of dark spots and patches on optical devices, caused by uneven screen uniformity or a localized stress. Any kind of stress, even at low levels, inside the adhesive layer can cause Mura and this is not a repairable defect for optical devices. Pressure sensitive adhesives with low modulus (soft) is desirable to overcome the Mura.

Hydrogels have also been used as adhesive film layer for electronic devices. U.S. Pat. Nos. 5,559,165 and 6,448,303 references disclose soft adhesives that leave no oil residue upon removal from a hard substrate. EP175562 reference describes electron-beam curable hydrogel-like soft adhesives. Similarly, U.S. Pat. No. 5,262,468 reference describes the use of high viscosity rubbers (40,000 cp at 25 wt % in toluene) to obtain gelatinous thermoplastic compositions. While all of these compositions are soft and pliable, they lack adhesive adhesion and fail to adhere to substrates.

Pressure sensitive adhesives with a balanced low modulus and balanced peel adhesion are desirable to overcome the Mura problem and delamination problem. It is also desirable for the pressure sensitive adhesive to have a wide temperature use range.

Therefore, there is a need in the art for pressure sensitive adhesive film in electronic devices with high optical clarity over prolonged time, wide temperature usage, high peel adhesion and low modulus after cure. The current invention fulfills this need.

BRIEF SUMMARY OF THE INVENTION

The invention provides curable silicone pressure sensitive adhesive compositions and films suitable for sealing and adhering substrates for electronic devices. The cured film enhances light transmission and optical effects for a prolonged time in a wide range of temperatures; provide high adhesion, low Mura and modulus.

One aspect of the invention is directed to a curable silicone pressure sensitive adhesive composition comprising a mixture of:
(a) about 10 to about 98% of a reaction product of:
 (i) a reactive polydimethylsiloxane polymer, which is a polydimethylsiloxane polymer α,ω-endcapped with a functional group;
 (ii) a reactive silicone resin; and
 (iii) an acid or a base catalyst that has a pKa value equal to or less than −6 or equal to or greater than 15;
(b) about 1 to about 45% of a (meth)acrylate functionalized polydimethylsiloxane polymer or oligomer;
(c) about 1 to about 45% of a silicone resin or a polydimethylsiloxane polymer or oligomer; and
(d) 0.001-5% of a radical initiator.
The cured adhesive has a transmittance of greater than 90% measured in accordance with ASTM E903 at 500 nm.

Another aspect of the invention is directed to a curable silicone pressure sensitive adhesive composition comprising a mixture of:
(a) about 95 to about 99.999% of a reaction product in an organic solvent of:
 (i) a reactive polydimethylsiloxane polymer;
 (ii) a reactive silicone resin;
 (iii) a (meth)acrylate and/or methoxyl functionalized polydimethylsiloxane polymer or oligomer; and
 (iv) an acid or a base catalyst that has a pKa value equal to or less than −6 or equal to or greater than 15;
(b) about 0.001 to about 5% of a radical initiator; and
(c) optionally, up to 45% of a silicon resin or a polydimethylsiloxane polymer or oligomer.
The cured adhesive has a transmittance, measured in accordance with ASTM E903 at 500 nm, of greater than 90%.

Yet another aspect of the invention is directed to a method of forming a curable silicone pressure sensitive adhesive film comprising the steps of:
(1) preparing a reaction product of (i) a reactive polydimethylsiloxane polymer, which is a polydimethylsiloxane α,ω-endcapped with a functional group, (ii) a reactive silicone resin; and (iii) an acid or a base catalyst in an organic solvent to form a non-curable silicon network; and (2) combining the non-curable silicon network with (iv) about 5 to about 45% of a (meth)acrylate terminated polydimethylsiloxane polymer or oligomer, (v) 5-45% of a silicone resin; (vi) about 0.001 to about 5% of a radical initiator, and (vii) optionally, a polydimethylsiloxane polymer or oligomer having a weight average molecular weight of less than about 50,000 to form a solution in an organic solvent;

(3) preparing a first release-liner;

(4) coating the solution onto the first release-liner;

(5) let the organic solvent evaporate from the coated film on the first release-liner to form a substantially solvent-free film; and (6) laminating a second release-liner onto the substantially solvent-free film.

In a further aspect of the invention is directed to a method of forming an electronic device comprising the steps of:

(1) making the curable silicone pressure sensitive adhesive film prepared by combining a reaction product of (i) a reactive polydimethylsiloxane polymer (ii) a reactive silicone resin; and (iii) an acid or a base catalyst in an organic solvent with (iv) a (meth)acrylate terminated polydimethylsiloxane polymer or oligomer; (v) a silicone resin; and (vi) a radical initiator, (2) coating the film in between two release liners;

(3) preparing a first substrate, wherein the substrate can be a front cover sheet or a back substrate of the device;

(4) removing one of the release-liner;

(5) laminating the curable silicone pressure sensitive adhesive film onto the device substrate at a pressure of about 0.01 to about 0.5 MPa;

(6) removing the other release-liner;

(7) laminating the curable silicone pressure sensitive adhesive film onto the a second device substrate at a pressure of about 0.01 to about 0.5 MPa; and/or a vacuum of about 0.01 to about 0.1 MPa, and/or at a temperature of about 30 to 80° C.;

(8) curing the curable silicone pressure sensitive adhesive film with a dosage of UVA&V 1-5 J/cm², and/or heat at 80-150° C.;

whereby the adhesive film adheres onto the first device and the second device substrates.

In another aspect of the invention is directed to a method of forming an electronic device comprising the steps of:

(1) making the curable silicone pressure sensitive adhesive film prepared by combining a reaction product of (i) a reactive polydimethylsiloxane polymer; (ii) a reactive silicone resin; (iii) a (meth)acrylate terminated polydimethylsiloxane polymer or oligomer; and (iv) an acid or a base catalyst in an organic solvent with (v) a radical initiator, and optionally (vi) a silicon resin or a polydimethylsiloxane polymer or oligomer;

(2) coating the film in between two release liners.

(3) preparing a first substrate, wherein the substrate can be a front cover sheet or a back substrate of the device;

(4) removing one of the release-liner;

(5) laminating the curable silicone pressure sensitive adhesive film onto the device substrate at a pressure of about 0.01 to about 0.5 MPa;

(6) removing the other release-liner;

(7) laminating the curable silicone pressure sensitive adhesive film onto the a second device substrate at a pressure of about 0.01 to about 0.5 MPa; and/or a vacuum of about 0.01 to about 0.1 MPa, and/or at a temperature of about 30 to 80° C.;

(8) curing the curable silicone pressure sensitive adhesive film with a dosage of UVA&V 1-5 J/cm², and/or heat at 80-150° C.;

whereby the adhesive film adheres onto the first device and the second device substrates.

Yet in another aspect of the invention is directed to a method of forming an electronic device comprising the steps of:

(1) making the curable silicone pressure sensitive adhesive film prepared by combining a reaction product of (i) a reactive polydimethylsiloxane polymer; (ii) a reactive silicone resin; and (iii) an acid or a base catalyst in an organic solvent with (iv) a (meth)acrylate terminated polydimethylsiloxane polymer or oligomer; (v) a silicone resin; and (vi) a radical initiator;

(2) coating the film in between two release liners;

(3) curing the curable silicone pressure sensitive adhesive film between the two release liners, with a dosage of UVA&V 1-5 J/cm², and/or heat at 80-150° C.; whereby the adhesive film adheres onto the first device and the second device substrates;

(4) preparing a first substrate, wherein the substrate can be a front cover sheet or a back substrate of the device;

(5) removing one of the release-liner;

(6) laminating the curable silicone pressure sensitive adhesive film onto the device substrate at a pressure of about 0.01 to about 0.5 MPa;

(7) removing the other release-liner;

(8) laminating the curable silicone pressure sensitive adhesive film onto the a second device substrate at a pressure of about 0.01 to about 0.5 MPa; and/or a vacuum of about 0.01 to about 0.1 MPa, and/or at a temperature of about 30 to 80° C.

In another aspect of the invention is directed to a method of forming an electronic device comprising the steps of:

(1) making the curable silicone pressure sensitive adhesive film prepared by combining a reaction product of making the curable silicone pressure sensitive adhesive film prepared by combining a reaction product of (i) a reactive polydimethylsiloxane polymer; (ii) a reactive silicone resin; (iii) a (meth)acrylate terminated polydimethylsiloxane polymer or oligomer; and (iv) an acid or a base catalyst in an organic solvent with (v) a radical initiator; and optionally (vi) a silicon resin or a polydimethylsiloxane polymer or oligomer;

(2) coating the film in between two release liners;

(3) curing the curable silicone pressure sensitive adhesive film between the two release liners, with a dosage of UVA&V 1-5 J/cm², and/or heat at 80-150° C.; whereby the adhesive film adheres onto the first device and the second device substrates;

(4) preparing a first substrate, wherein the substrate can be a front cover sheet or a back substrate of the device;

(5) removing one of the release-liner;

(6) laminating the curable silicone pressure sensitive adhesive film onto the device substrate at a pressure of about 0.01 to about 0.5 MPa;

(7) removing the other release-liner;

(8) laminating the curable silicone pressure sensitive adhesive film onto the a second device substrate at a pressure of about 0.01 to about 0.5 MPa; and/or a vacuum of about 0.01 to about 0.1 MPa, and/or at a temperature of about 30 to 80° C.

These and other aspects of the invention are described in the detailed description below. In no event should the above

DETAILED DESCRIPTION OF THE INVENTION

All documents cited herein are incorporated in their entireties by reference.

Percent, unless expressly stated otherwise, means dry solid weight percent based on the total weight of the components.

As used herein, an "oligomer" is a molecular complex that consists of at least two monomer units but less than the number of units of a polymer.

As used herein, a "polymer" is a molecular complex that consists of monomer units greater than about 15 monomer units.

As used herein, the term "optically clear" or "optical clarity" refers to transmission of a film of 90% or greater measured in accordance with ASTM E903 at 500 nm.

As used herein, the terms "optically clear adhesive," and "OCA," used interchangeably, refer to adhesive that has optical clarity.

As used herein, the terms "device" and "electronic device," used interchangeably, refer to an article that has various components such as, circuits or active layers in between a cover front sheet and a substrate back sheet, and operates by manipulating the flow of electrons, e.g., displays, including flexible and foldable displays, outdoor displays, LCD displays, LED displays; diffusers; rigid compensators; heaters; flexible polarizers; touchscreens; flexible thin film photovoltaic cells; mobile phone; tablet PC; TV; notebook PC; digital camera; photo frame; car navigation; and the like.

As used herein, the terms "film," "tape," and "encapsulants" used interchangeably, refer to an adhesive in a free-standing form that adhere the components and/or substrates together in the devices.

As used herein, the terms "reactive" refer to a molecule's ability to hydrolyze in the presence of an acid or a base catalyst.

As used herein, the terms "pressure sensitive adhesive" or "PSA," used interchangeably, refer to a viscoelastic material which adheres instantaneously to most substrates with an application of slight pressure and remains permanently tacky.

As used herein, the terms "polydimethylsiloxane" or "PDMS" used interchangeably, refer to a dimethyl substituted polysiloxane.

As used herein, the terms "(meth)acrylate functionalized polydimethylsiloxane, "(meth)acrylate functionalized PDMS" or "PDMS-DA" used interchangeably, refer to a dimethyl substituted polysiloxane, with α,ω-endcapped (meth)acrylate functional groups.

The invention provides an optically clear, curable, silicone-based pressure sensitive adhesive composition. The curable silicone pressure sensitive adhesive composition comprises (a) about 10 to about 98% of a reaction product, (b) about 1 to about 45% of a (meth)acrylate functionalized polydimethylsiloxane polymer or oligomer, (c) about 1 to about 45% of a silicone resin or a polydimethylsiloxane polymer or oligomer, and (d) about 0.001 to about 5% of a radical initiator. The reaction product (a) comprises (i) a reactive polydimethylsiloxane polymer, which is a polydimethylsiloxane polymer α,ω-endcapped with a functional group, (ii) a reactive silicone resin; and (iii) an acid or a base catalyst that has a pKa value equal to or less than −6 or equal to or greater than 15. The cured adhesive has a transmittance of greater than 90% measured in accordance with ASTM E903 at 500 nm. In another embodiment, the optically clear, curable, silicon based pressure sensitive adhesive comprises (a) about 95 about 99.999% of a reaction product in an organic solvent of: (i) a reactive polydimethylsiloxane polymer, (ii) a reactive silicone resin, (iii) a (meth)acrylate and methoxyl functionalized polydimethylsiloxane polymer or oligomer; and (iv) an acid or a base catalyst that has a pKa value equal to or less than −6 or equal to or greater than 15; (b) about 0.001 to about 5% of a radical initiator; and (c) optionally, up to 45% of a silicon resin or a polydimethylsiloxane polymer or oligomer. The cured adhesive has a transmittance, measured in accordance with ASTM E903 at 500 nm, of greater than 90%.

The reaction between the reactive polydimethylsiloxane and the reactive silicone resin occurs at the α,ω-endcaps of the polydimethylsiloxane site and at the functionalized silicone resin site in the presence of the catalyst in the organic solvent. The ratio of the reactive polydimethylsiloxane polymer or oligomer to the reactive silicone ranges from 1:9 to 9:1. The reaction product is a lightly covalently cross-linked network between the polydimethylsiloxane and the silicone resin, and yet this network remains soluble in organic solvent.

The weight average molecular weight (Mw) of reactive α,ω-endcapped polydimethylsiloxane is from about 100 to about 1,000,000 g/mol, preferably, from about 400 to about 350,000 g/mol. The reactive polydimethylsiloxane polymer is preferably end-capped with reactive group such as hydroxyl and/or alkoxy, groups. Other α,ω-endcapped polydimethylsiloxane, such as diorganosiloxane polymers, can be used. Other diorgano substituents include, for example, methylvinyl, methylphenyl, diphenyl, methylethyl, and 3,3,3-trifluoropropylmethyl. In a preferred embodiment, the diorgano substitutes are all dimethyl substituents (PDMS).

A reactive silicone resin is a network of silicone polymer that contains a combination of $R_3SiO_{1/2}$ (M unit), $R_2SiO_{2/2}$ (D unit), $RSiO_{3/2}$ (T unit) and/or $SiO_{4/2}$ (Q unit) in the cage-like chemical Si—O—Si structure. It can be made according to procedures in U.S. Pat. Nos. 2,676,182, 2,814,601 and is also obtained from various commercial sources. Preferred functionalized silicone resin is a silicone resin having both M unit and Q unit, also known as MQ resin. Useful reactive MQ silicone resins in the invention include silicone resins that contain 0.05 to 5 weight percent of silicone-bound hydroxyl group and further comprise M and Q units in a mole ratio of from 0.5-1.5 M units for each Q. The MQ resin is soluble in toluene, xylene, heptane, and the like. Preferred R groups of the M unit in MQ resin are methyl and hydroxyl. The mole ratio of $SiO_{4/2}$ (Q unit) to $R_3SiO_{1/2}$ (M unit) ranges from 1:2 to 2:1. One preferred R group is a combination of hydroxyl and methyl groups, with 0.001 to 1 Si—OH for each Si-Me. The preferred MQ resin has a weight average molecular weight of the functionalized silicone resin is from about 500 to about 200,000 g/mol.

Useful catalysts can be any acid, or base, and mixtures thereof. Preferred catalysts have a pKa value that has a pKa value equal to or less than −6 or equal to or greater than 15 in a hydrocarbon solvent. Examples of the preferred catalyst are KOH, NaOH, LiOH, organolithium reagents, Grignard reagents, methanesulfonic acid, sulfuric acid, and mixtures thereof. Other examples of the catalyst include organometallic salts of metals such as tin, titanium, aluminum, bismuth. Combination of more than one type of catalysts above can also be used.

The reaction to form the non-curable silicone product is conducted in an organic solvent or co-solvents, selected from the aliphatic hydrocarbons, aromatic hydrocarbons, diethyl ethers, tetrahydrofurane, ketones, acetates, water and mixtures thereof. Preferred solvents include xylene, toluene, heptane, tetrahydrofuran, and mixtures thereof.

Reaction of the reactive PDMS polymer and reactive MQ silicone resin may take place at room temperature or at an elevated temperatures or up to about 160° C. The preferred temperature is in the range of 60-150° C. Typically the reaction is from about 1 to about 24 hours. Heating can be continued until the desired physical properties such as T-peel adhesion or modulus are achieved for the reaction product. The solid content of the reaction is from about 20 to 80%, and can be adjusted by adding or removing solvent.

About 10 to about 98% of the above reaction product is then combined to the rest of components to form an optically clear pressure sensitive adhesive. One component is a polydimethylsiloxane polymer or oligomer containing free radical reactive functional groups. Preferably, the functional PDMS (i) has a weight average molecular weight (Mw) of from about 400 to about 350,000 g/mol and (ii) contains at least one free radical reactive functional group per polymer or oligomer chain. One preferred functional PDMS is a (meth)acrylate functionalized PDMS polymer or oligomer. Preferably about 1 to about 45% of the (meth)acrylate functionalized PDMS polymer or oligomer is added to the reaction product to form the curable silicone pressure sensitive adhesive composition.

The functional group for the PDMS polymer or oligomer is preferably selected from terminal methacrylates, pendant methacrylates, terminal acrylates, or pendant acrylates. Examples of siloxane (meth)acrylic oligomers or macromers include polydimethylsiloxane mono (meth)acrylate, e.g. trialkoxylsilyl (meth)acrylates, dialkoxysilyl (meth)acrylates or methacrylates. Preferred siloxane (meth)acrylic macromers are trimethoxylsilyl and dimethoxymethylsilyl functional PDMS-acrylate or methacrylates. The siloxane (meth) acrylic macromer is in the content of about 0.2 to 50 weight percent based on the total weight of (meth)acrylic monomers. The amount of polysiloxane-containing (meth)acrylic macromer will typically be used in amounts of from 0.2 to 50 weight percent, more preferably, 1 to 15 weight percent of the acrylic polymer. Exemplary functional PDMS polymers or oligomers include, but are not limited to, di(meth) acrylated-polydimethyl siloxane, silquiloxane, silane monomers, from Gelest, etc. A particularly preferred functional PDMS is methacryloxypropyldimethoxy terminated PDMS made by Henkel Corporation, as described in U.S. Pat. No. 5,300,608.

Other acrylic polymer that can advantageously be used as the functional group in the reactive functional PDMS are acrylic polymers comprising end-capped alkoxysilyl functional groups or polysiloxane-blocked or grafted copolymers. Examples of the end-capped alkoxysilyl functional groups are trialkoxylsilyl, dialkoxysilyl functional groups. Preferred end-capped alkoxysilyl functional groups are trimethoxylsilyl, dimethoxymethylsilyl, triethoxylsilyl and/ or diethoxymethylsilyl functional groups. Examples of such polymers are MS-polymer from Kaneka. Block copolymers are also useful. An example of a polysiloxane block copolymer is polydimethylsiloxane-acrylic block copolymer. The preferred amount of siloxane block is 10 to 50 weight percent of the whole block polymer.

The optically clear pressure sensitive adhesive further comprises a silicone resin or a polydimethylsiloxane polymer or oligomer. The silicone resin or the polydimethylsiloxane polymer or oligomer is present at a level of about 1 to up to about 45%.

The silicone resin can be the same MQ resin as is previously used to form described above in the reaction product between (meth)acrylate functionalized PDMS and the silicone resin. Other preferred silicone MQ resins contains vinyl, phenyl, (meth)acryloxy, and mixtures thereof in the M units. The silicone MQ resins can be also further treated with $Me_3SiOSiMe_3$, $ViMe_2SiOSiMe_2Vi$, $MeViPhSiOSiPhViMe$, $Me_3SiNHSiMe_3$ or triorganosilane such as $Me_3SiCl$, $Me_2ViSiCl$ or $MeViPhSiCl$ to reduce the amount of Si—OH in the silicone resin. The mole ratio of $SiO_{4/2}$ (Q unit) to $R_3SiO_{1/2}$ (M unit) ranges from 1:2 to 2:1. The preferred silicone resin has a weight average molecular weight of the functionalized silicone resin is from about 500 to 200,000 g/mol. The curable silicone pressure sensitive adhesive composition comprises about 1 to about 45% of the silicone resin.

The polydimethylsiloxane polymer or oligomer may be the same PDMS as previously described to form the reaction product between PDMS and the silicone resin or a nonreactive PDMS polymer or oligomer. Other preferred polydimethylsiloxane polymer or oligomer contains methyl, vinyl, epoxy, alkoxyl end capped groups to improve adhesion or to have dual cure properties. Yet other preferred polydimethylsiloxane polymer or oligomer is a block copolymer of polydimethylsiloxane with polyimide, polyester, polyether, polyethylene glycol, polypropylene glycol, which is compatible to the curable adhesive and provides adhesion to various substrates. In one embodiment, the PDMS polymer or oligomer is α,ω-endcapped with methyl, hydroxyl, hydride, vinyl, (meth)acryloxy groups. The polydimethylsiloxane polymer or oligomer has a weight average molecular weight (Mw) of from about 400 to 350,000 g/mol.

The pressure sensitive adhesive further comprises a radical initiator that generates free radicals and cures the adhesive by radiation cure or by heat cure. The term radiation cure herein refers to crosslinking, toughening, hardening or vulcanization of the curable portion of the adhesives through actinic radiation exposure. Actinic radiation is electromagnetic radiation that induces a chemical change in a material, including electron-beam curing. In most cases, such radiation is ultraviolet (UV) or visible light. The initiation of radiation cure is achieved through the addition of an appropriate photoinitiator. The cure of the adhesive is achieved by direct exposure to ultraviolet (UV) or visible light or by indirect exposure through transparent cover sheet that are made of polyester, polycarbonate, glass, and the like.

The selection of a photoinitiator for the radiation curable adhesive is familiar to those skilled in the art of radiation and heat cure, and is highly dependent on the specific applications in which the adhesives are to be used. The photoinitiator is a UV cleavable photoinitiator, and may comprise one or more types of photoinitiator and optionally one or more photosensitizers. Radical photopolymerization initiating system comprising one or more photoinitiators and photosensitizers can be found in Fouassier, J-P., Photoinitiation, Photopolymerization and Photocuring Fundamentals and Applications 1995, Hanser/Gardner Publications, Inc., New York, N.Y. Suitable radical photoinitiators include Type I alpha cleavage initiators such as acetophenone derivatives such as 2-hydroxy-2-methylpropiophenone and 1-hydroxycyclohexyl phenyl ketone; acylphosphine oxide derivatives such as bis(2,4,6-trimethylbenzoyl) phenylphosphine oxide; and benzoin ether derivatives such as benzoin methyl ether and benzoin ethyl ether. Type II photoinitiators are also suitable for the curable adhesive, and they include benzophenone, isopropylthioxanthone, and anthroquinone. Many substituted derivatives of the aforementioned compounds may also be used.

A suitable photoinitiator is one that exhibits a light absorption spectrum that is distinct from that of the resins, and other additives in the adhesive. The amount of the photoinitiator is typically is in a range of about 0.001 to about 10 parts, preferably, from about 0.01 to about 1 parts, based on the 100 parts of total weight of the adhesive.

In one embodiment, the adhesive is cured through an optical clear cover sheet or front sheet, and the photoinitiator must be capable of absorbing radiation at wavelengths for which the cover or substrate sheets are transparent. For example, if an adhesive is to be cured through a sodalime glass coverplate, the photoinitiator must have significant UV absorbance above 320 nm. UV radiation below 320 nm will be absorbed by the sodalime glass coverplate and cannot reach the photoinitiator in the adhesive films. In this example, it would be beneficial to include a red shifted photoinitiator, or a photosensitizer with the photoinitiator as one photoinitiating system, to augment the transfer of energy to the photoinitiator. If an adhesive is to be cured through a PET film with cut-off absorbance at 400 nm and below, the photoinitiator must have UV absorbance above 400 nm. Examples of such photoinitiators include, but are not limited to, IRGACURE® 819, IRGACURE® 2022, LUCIRIN® TPO, LUCIRIN® TPO-L, which are commercially available from BASF. The range of UV radiation may be modified as necessary, and such modifications are within the expertise of the practitioner skilled in the art.

The term "heat cure" herein refers to toughening, hardening or vulcanization of the curable portion of the adhesive through exposure to heat in oven, infrared (IR), near IR, or microwave. The heat cure temperature is between 50-200° C., preferably 60-100° C. The initiation of the heat cure is achieved through the addition of an appropriate thermal radical initiator.

The radical initiators for heat cure include peroxides, such as, 1,1,3,3-tetramethylbutyl peroxy-2-ethyl-hexanoate, 1,1-bis (t-butylperoxy) cyclohexane, 1,1-bis(t-butylperoxy)cyclo-dodecane, di-t-butyl peroxyisophthalate, t-butyl peroxybenzoate, dicumyl peroxide, t-butyl cumyl peroxide, 2,5-dimethyl-2,5-di(t-butylperoxy) hexane, 2,5-dimethyl-2,5-di (t-butylperoxy)-3-hexyne and cumene hydroperoxide. The amount of the initiator for heat cure is typically is in a range of about 0.001 to about 10 parts based on 100 parts of the total weight of the adhesive.

In one embodiment, the thermal-curing initiator is desirably selected to provide a moderate initiation temperature, which is high enough to prevent premature cross-linking, but also low enough to prevent exposing electronic devices to excess temperatures. Excessively high temperatures may degrade the reactive organic components within the devices. Examples of suitable commercially available free radical thermal initiator include, but are not limited to, LUPEROX TBEC from United Initiators, TRIGONOX 101 and TRIGONOX 201 from Akzo Nobel Polymer Chemicals, LUPEROX 101 and LUPEROX 231 from Arkema, DICUP from GEO Specialty Chemicals, 2,5-Dimethyl-2,5 BIS (Tert-Butyl Peroxy) Hexyne-3, such as those available under the trade designation LUPEROX 130 from Arkema, TRIGONOX 145 from Akzo Nobel Polymer Chemicals; Di-Tert-Butyl Peroxide such as those available under the trade designation TRIGONOX B from Akzo Nobel Polymer Chemicals. Typical cure temperatures for these free radical initiators typically range from about 80 to about 150° C., but temperatures can be increased for faster cures.

Optionally, inorganic fillers, and desiccants may further be added to the curable adhesive of the invention. The inorganic fillers may be used to improve the cohesive strength, rheology, and moisture and oxygen barrier properties of the adhesives. Representative fillers include, but are not limited to, ground quartz, fused silica, amorphous silica, talc, glass beads, graphite, carbon black, alumina, metal powders, clays, graphene, nanoclay, mica, aluminum nitride, and boron nitride. The desiccants may be added to the curable adhesive of the invention to improve the moisture barrier properties of the adhesive. A representative list of such desiccants can be found in Dean, J. Lange's Handbook of Chemistry, 1999, McGraw Hill, Inc., New York, N.Y., pp. 11.5. In general, suitable desiccants include metal oxides, such as, CaO, BaO, MgO; other oxides, such as $SiO_2$, $P_2O_5$, $Al_2O_3$; metal hydrides, such as $CaH_2$, NaH, $LiAlH_4$; metal salts, such as $CaSO_4$, $Na_2SO_4$, $MgSO_4$, $CaCO_3$, $K_2CO_3$, and $CaCl_2$; powdered zeolites, such as 4A and 3A molecular sieves; metal perchlorates, such as, $Ba(ClO_4)_2$, $Mg(ClO_4)_2$; superabsorbent polymers, such as, lightly cross linked poly (acrylic acid); and metals that react with water, such as calcium. The desiccants are capable of reacting with, absorbing, or adsorbing water and/or water vapor.

Optionally, silane, hydrolyzable polymeric and/or oligomeric adhesion promoters may further be added to the curable adhesive of the invention. Examples of silane adhesion promoters that are useful include, but are not limited to, C3-C24 alkyl trialkoxysilane, (meth)acryloxypropyltrialkoxysilane, chloropropylmethoxysilane, vinylthmethoxysilane, vinylthethoxysilane, vinyltrismethoxyethoxysilane, vinylbenzylpropylthmethoxysilane, aminopropyltrimethoxysilane, vinylthacetoxysilane, glycidoxypropyltrialkoxysilane, beta.-(3,4-epoxycyclohexyl)ethyltrimethoxysilane, mercaptopropylmethoxysilane, aminopropyltrialkoxysilane, and the like. However, silane adhesion promoters that reacts and degrades any active organic component should not be added to adhesives intended for use in electronic device. Examples of functional polymeric and/or oligomeric adhesion promoters that are useful include, but are not limited to, hydrolysable PDMS polymer or oligomer, e.g., PDMS that is endcapped with trialkoxylsilyl (meth)acrylates, dialkoxysilyl (meth)acrylates or methacrylates groups. The adhesion promoter will typically be used in amounts of from 0.2 to 40 weight percent, more preferably, 1 to 20 weight percent of the whole curable silicone PSA. A particularly preferred polymeric and/or oligomeric adhesion promoters is methacryloxypropyldimethoxy terminated PDMS made by Henkel Corporation, according to U.S. Pat. No. 5,300,608. Occasionally, as known in the art, catalyst is together with the adhesion promoters for better results, in typically amounts of from 0.001 to 5 weight percent of the whole curable silicone PSA. Examples of such catalyst that are useful include, but are not limited to, amines, adhesion promotor catalyst and tin catalyst, e.g., dibutyltin dilaurate.

In another embodiment, the ratio of (i) the reactive polydimethylsiloxane polymer to (ii) the reactive silicone resin to (iii) the (meth)acrylate and/or methoxyl functionalized polydimethylsiloxane polymer or oligomer ranges from 1:8 to 1:8 to 1:8.

The adhesives solution in the invention have a Brookfield viscosity range of from about 100 to about 100,000 cps in the ranges of about 20-40° C., preferably about 1,000 to about 10,000 cps at 25-30° C. Such viscosity ranges allow the adhesive to be coatable into 15-250 um thickness films at ambient temperature. The viscosity is adjustable by solid % from 20 to 80%. The adhesive solution can be coated into PSA films for lab testing using the solution film applicator in lab. The coating procedure is well-known to those skilled in the art. The PSA film can further be UV cured with D-bulb (Fusion Systems) with a dosage of UVA&V 1-5 J/cm$^2$, or heat cured upon heating at >80° C. for 30 min.

The PSA adhesive film has a low modulus upon UV or heat cure, especially in the temperature range of −40 to 80° C. Low elastic modulus indicates that an adhesive is soft and can easily wet-out rough substrates to fill voids. Due to the low modulus, the adhesive film will also not impose any Mura on an electronic display device, e.g., LCD, while significantly improving the performance of the display device. Mura can be minimized if the optically clear adhesive films are soft after the cure in a wide range of temperatures. The elastic modulus measurement is well known to a person skilled in the art. The elastic modulus values recorded in this document have been measured with a photorheometry or RDA. The elastic shear modulus (G') of the cured adhesive is preferably to be less than $1.0\times10^7$ dyn/cm$^2$ at 20° C. and 10 rad/s after cure.

The cured silicone pressure sensitive adhesive composition is in an organic solvent with a percent solids content of about 30 to about 80 wt %. Preferred organic solvents include aliphatic hydrocarbons, aromatic hydrocarbons, diethyl ether, tetrahydrofurans.

The cured adhesive film must have good peel strength to substrates. Balance peel adhesion and soft modulus are important to avoid delamination between adhesive layer and substrate, when flexible electronic devices are subject to bending, or rigid devices at vertical position for a long period of time. The T-peel adhesion test was performed on Instron, in accordance with ASTM D1876, a well-known measurement to a person skilled in the art. T-peel test ASTM D1876 evaluates the force required to the progressively separate two bonded, flexible adherents. Variations in test specimen preparation such adhesive curing, adhesive thickness, adherents and conditioning provides insight for optimization in processes and application. The cured silicone PSA of the invention preferably has T-peel adhesion of >15 oz/in between PET substrates.

180 Peel adhesion can be conducted on Instron, in accordance with either PSTC 101 or ISO 8510 or ASTM D3330, well-known measurements to a person skilled in the art. The cured silicone PSA film of the invention preferably has 180 peel adhesion of >25 oz/in between PET and stainless steel panel.

Optical Properties (T %, haze % and yellow index b*) of the cured PSA film can be measured using Cary 300 from Agilent, in accordance with ASTM E903 and ASTM D1003. The adhesive is considered to be optically clear, if the cured silicone adhesive film exhibits an optical transmission of at least 90%, preferably >99% between glass slides, over 500-900 nm range, and with haze and yellowness b*<1%.

In one embodiment, the curable silicone PSA solution is formed by first preparing a reaction product of (i) a reactive α,ω-endcapped polydimethylsiloxane polymer, (ii) a functionalized silicone resin; and (iii) an acid or a base catalyst in an organic solvent to form a soluble and non-curable silicone crosslinked network; and then combining the reaction product with (iv) 5-45% of a (meth)acrylate terminated polydimethylsiloxane polymer or oligomer; (v) 5-45% of a silicone resins; (vi) 0.001-5% of a radical initiator; and (vii) optionally, 0-45% of a polydimethylsiloxane polymer or oligomer.

The adhesive can be formed as a PSA film by applying the adhesive solution onto a release liner as a coating, with a specified gram weight per square meter (GPSM), and letting the solvent evaporate in air or oven at an elevated temperature. A second release-liner is applied onto the substantially solvent-free PSA film, to form a laminate PSA film in between the two release liners. Exemplary release liners include PET film, Kraft paper with fluoro-silicone release coatings.

The curable silicone PSA film can be delivered as an uncured film, as being called UV curable optically clear film (UVOCA); or heat curable optically clear film (HOCA). Furthermore, the curable silicone PSA film can be delivered as a fully cured film, as being called optically clear film (OCA). The recommended cure condition is either by UV with a dosage of UV 1-5 J/cm$^2$, or upon heating at >80° C. The silicone PSA film can withstand shipping and storage temperatures under stress. This PSA film maintains pressure sensitivity at or below −40° C. and with minimal or zero cold flow in storage. The sheets and rolls can later be die cut into desirable sizes and shapes.

The electronic device utilizing the inventive silicone PSA film is assembled in various ways. In one embodiment, the PSA film is placed in between the two release liner substrates as described above, and one release liner is removed. The exposed adhesive film is laminated to either the front cover sheet or the back substrate of the device. Subsequently, the other release liner is removed from the PSA film and the exposed adhesive surface is then laminated to the remaining front sheet or the substrate. Lamination process, with a rubber roller laminator, under pressure in autoclave, heat and/or vacuum may be used to enhance lamination and avoid voids or trapping air. If PSA film is not cured as in the form of UVOCA or HOCA, the laminated device should then subject to cure with UV irradiation or heating to crosslink the PSA film and securely adheres the front cover sheet to the back substrate.

In another embodiment, the adhesive film is laminated to both front cover sheet and the back substrate simultaneously. Heat with temperature ranging from about 40° C. to about 150° C. Vacuum and/or pressure can be applied to enhance lamination and to remove any entrapped air (voids) between the layers. Preferably, the laminating temperature is below about 110° C., and in some application below about 80° C. because organic active components in the electronic devices may decompose at temperatures above 120° C. If PSA film is not cured as in the form of UVOCA or HOCA, the laminated device should then subject to cure with UV irradiation or heating to crosslink the PSA film and securely adheres the front cover sheet to the back substrate.

UV cure is completed by exposing the adhesive film to UV light source having a wavelength of about 280 to about 700 nm, with a dosage of about 1-5 J/cm$^2$. Heat cure is completed at heating at temperatures of from about >80° C., preferably at 120° C. over a period of time.

In another embodiment, the adhesive is first cured and then laminated onto the front cover sheet and the back substrate. The cured pressure sensitive adhesive film still has enough tack and grab and adheres onto the substrates.

In yet another embodiment, the adhesive film of the invention may be in a single layer or in a multilayer form in the device. The single layer film refers to the adhesive described in the invention as the sole and only film to adhere the cover and the substrate together. For multilayer form, at least one of the layers is the adhesive described in the invention, and the device further includes other layer(s) that may be made of other suitable substrate or polymeric material(s), for example, copolymers of α-olefins and α, β-ethylenically unsaturated carboxylic acids (i.e., acid copolymers), p artially neutralized ionic acid copolymers (i.e., ionomers), ethylene/vinyl acetate copolymers, polyvinyl acetals) (including acoustic grade polyvinyl acetals), polyurethanes, polyvinylchlorides, polyethylenes (e.g., linear low density polyethylenes), polyolefin block copolymer elastomers, copolymers of α-olefins and α, β-ethylenically unsaturated carboxylic acid esters (e.g., ethylene methyl acrylate copolymers and ethylene butyl acrylate copolymers), silicone elastomers, epoxy resins, and combinations thereof.

The curable adhesive of the invention is useful for display devices that requires optical clarity and/or touch sensory.

In one embodiment, the curable adhesive described herein is useful as optically clear adhesive (OCA) or ultra-violet curable optically clear adhesive (UVOCA) film for bonding optical assemblies. The term OCA and UVOCA is well established in the art. The OCA and UVOCA film bonds the cover lens, plastic or other optical materials to the display module substrate. OCA and UVOCA are generally used to improve the optical characteristics of the device, including minimizing Mura, as well as to improve durability and process efficiency. Major applications of OCA and UVOCA include capacitive touch panels, LED/OLED televisions.

In one particular embodiment, the curable silicone PSA film of the invention is particularly useful as OCA or UVOCA for flexible and foldable display devices that requires resistance to folding and bending curvature.

There are several ways to incorporate the OCA or UVOCA film of the invention between the cover lens and the display module substrate in the LCD, LED, touch panel display devices. The OCA or UVOCA film of the invention is preferably applied on the cover lens. The OCA or UVOCA film is typically protected between two release liners, the first liner is thinner (25-50 μm) and easier to remove, and the other is thicker (75-100 μm) and has higher release force. The OCA or UVOCA film, after the first liner is removed, is applied onto the cover lens by pressing and laminating in one direction by a rubber roll. The second release liner is then removed and the exposed surface of the adhesive film is laminated unto the display module substrate, preferably under vacuum (<0.1 MPa) and/or pressure in autoclave (<0.5 MPa). Vacuum condition is preferred for a bubble-free bonding. Heating may also be applied, preferably in the rage of about 40 to about 80° C.

The UVOCA of the invention is cured through the top substrate by exposure to electromagnetic irradiation comprising a wavelength ranging from 200 nm to 700 nm, preferably from 450 nm to 500 nm. The curing degree can be determined by measuring the decrease of the IR absorption at an absorption peak which is characteristic to the corresponding formulation chemistry. This is well established to the person skilled in the art. UV-irradiation can be supplied with a continuous high intensity emitting system, such as those available from Fusion UV Systems. A metal halide lamp, LED lamp, high-pressure mercury lamp, xenon lamp, Xenon flash lamp etc. can be used for UV cure, with an energy range of about 1 to about 5 J/cm$^2$.

In a preferred embodiment, the top substrate is selected from glass or polymer film, preferably plastic films, including in particular polyethylene terephthalate, polymethyl (meth)acrylate, polyimide film, and/or triacetate cellulose (TAC). In another preferred embodiment, the top substrate is a reflector, cover lens, touch panel, retarder film, retarder glass, LCD, lenticular lens, mirror, anti-glare or anti-reflective film, anti-splinter film, a diffuser or an electromagnetic interference filter. For example for 3D TV applications, a glass or film retarder will be bonded onto a LCD for passive 3D TV, or a TN LCD or lenticular lens is bonded a regular TFT LCD for naked eye 3D. The base substrate is a LCD module with polarizer film on top. The base substrate can be a display panel, preferably selected from a liquid crystal display, a plasma display, a light-emitting diode (LED) display, an electrophoretic display, and a cathode ray tube display.

Yet in another embodiment, the display panel has a touch functionality. The adhesive of the invention and the application process of the invention can be used for any touch panel sensor assembly. The adhesive of the invention can be used to bond touch panel sensors that require two layers of indium-tin-oxide coated glass. The adhesive can be used for cover lens bonding, in particular to fill the air gap in touch panel sensors that utilize a cover lens, such as clear plastic polymethyl (meth)acrylate, and the glass touch panel sensor. The adhesive can be used for directly bonding the cover lens to a LCD module. In another embodiment, the invention comprises the possibility of two or more top substrates bonded one after another onto a base substrate with the OCA or UVOCA of the invention between layers.

In one embodiment, the curable adhesive is useful as an encapsulant for flexible photovoltaic module/cell (interchangeably used herein). The photovoltaic module assembly includes any article or material that can convert light into electrical energy. In forming the photovoltaic cell, the encapsulant sheet or roll, comprising the curable adhesive film, is laminated to the photovoltaic module assembly. The flexible photovoltaic cell, including the encapsulant, must be sufficiently transparent to allow adequate sunlight or reflected sunlight to reach the photovoltaic cells and withstand folding and bending curvature during its usage.

The curable adhesive is reworkable. If a defect is found in an electronic device, the film can be readily removed from either the cover sheet or the substrate. The adhesive film remains as a single, solid piece or breaks into few pieces that can be removed without any solvent or without damaging the other components in the device. The cover sheet and the substrate can be reused with another adhesive film to form another electronic device.

Many modifications and variations of this invention can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled.

EXAMPLES

Elastomer 50N (Mw 110000 g/mol) is a silicone polymer, commercially available from Wacker.

PDMS-DA is methacryloxypropyldimethoxy terminated polydimethylsiloxane, commercially available from Henkel.

MQ is a hydroxyl functional silicone resin (Mw~9000 g/mol) commercially available from Dow Corning, Momentive and Wacker.

Heptane, ammonium carbonate, n-butyl lithium (1.6M in hexane) (nBuLi), potassium hydroxide (1.0N water solution) are commercially available from Aldrich.

TPO is a photoinitiator, commercially available from BASF.

Tests Temperature Sweep Test:

A Rheometrics Dynamic Mechanical Analyzer (Model RDA 700) was used to obtain the elastic moduli (G'), loss modulus (G") and tan delta versus temperature sweep. The instrument was controlled by Rhios software version 4.3.2. Parallel plates 8 mm in diameter and separated by a gap of about 2 mm were used. The sample was loaded and then cooled to about −100° C. and the time program started. The program test increased the temperature at 5° C. intervals followed by a soak time at each temperature of 10 seconds. The convection oven was flushed continuously with nitrogen. The frequency was maintained at 10 rad/s. The initial strain at the start of the test was 0.05% (at the outer edge of the plates). An autostrain option in the software was used to maintain an accurately measurable torque throughout the test. The option was configured such that the maximum applied strain allowed by the software was 80%. The autostrain program adjusted the strain at each temperature increment if warranted using the following procedure. If the torque was below 200 g-cm the strain was increased by 25% of the current value. If the torque was above 1200 g-cm it was decreased by 25% of the current value. At torques between 200 and 1200 g-cm no change in strain was made at that temperature increment. The shear storage or elastic modulus (G') and the shear loss modulus (G") are calculated by the software from the torque and strain data. Their ratio, G"/G', also known as the tan delta, was also calculated. The soft block Tg was taken as the maximum in tan delta. Flow temperature was reported as the temperature where elastic modulus and loss modulus values equal to one another: G"=G'.

T-Peel Test:

The T-peel adhesion test was performed on Instron Sintech 1/D, in accordance with ASTM D1876. The procedure was as follows: (1) transfer adhesive films to between two 2-3 mil PET films; (2) UV cure the laminated adhesive with D-bulb (Fusion Systems) with a dosage of UVA&V 1-5 J/cm$^2$; (3) cut specimens to 1.0 in wide×6-12 in long strips; (4) condition at 23° C. and 50% relative humidity for 12 hr; (5) perform the T-peel adhesion at 23° C. and 50% relative humidity: clamp each ends of the t-peel specimen in separate test grips of the Instron at a rate of 12.0 in/min) length of the bond line.

Transmission Test:

Optical properties (T %, haze % and yellow index b*) were measured with a spectrometer, Cary 300 from Agilent, in accordance with ASTM E903 and ASTM D1003. Preferred testing method for transmission was as follows: (1) place a small film of adhesive on a 75 mm by 50 mm plain micro slide (a glass slide from Dow Corning, Midland, Mich.), that had been wiped three times with isopropanol; (2) attach a second glass slide onto the adhesive under a force; (3) cure the adhesive with a D-bulb (Fusion Systems) at UVA&V 1-5 J/cm$^2$; and measure the optical transmission from 300 to 900 nm with the spectrometer.

Example 1

A mixture of polydimethylsiloxane polymer (Wacker Elastomer 50N, 15 g), hydroxyl MQ resin (33 g), (NH$_4$)$_2$CO$_3$ (0.3 g), and heptane (60 g) was stirred at 60° C. for 2 hr. The reaction mixture was then heated to reflux of heptane for 2 hours, with a slow N$_2$ purge. The product was cooled to room temperature and packed in a glass jar.

Examples 2-6

Examples 2-6 were made by combining additional components to Example 1, as set forth in Table 1.

TABLE 1

| Examples | 1 | 2 | 3 | 4 | 5 | 6 |
|---|---|---|---|---|---|---|
| Components | | | | | | |
| Example 1, g | 10 | 10 | 10 | 10 | 10 | 10 |
| PDMS-DA, g | NA | 2.5 | 2.5 | 2.5 | 2.5 | 2.5 |
| MQ, g | NA | 2.5 | 3.5 | 5.5 | 7.0 | 8.5 |
| Elastomer 50N, g | NA | 0 | 0 | 0 | 0 | 0 |
| TPO, g | NA | 0.05 | 0.05 | 0.05 | 0.05 | 0.05 |
| Properties | | | | | | |
| T-Peel, oz/in | | 29 | 20 | 28 | 31 | 29 | 26 |
| G', ×10$^5$ dyn/cm$^2$, −40° C. | 5670 | 5690 | 6200 | 6710 | 6970 | 7370 |
| G', ×10$^5$ dyn/cm$^2$, 20° C. | 320 | 440 | 740 | 980 | 1160 | 2040 |
| G', ×10$^5$ dyn/cm$^2$, 80° C. | 0.8 | 1.9 | 2.2 | 3.2 | 5.8 | 23 |

As shown in Table 1, adding more MQ led to higher T-peel values and higher shear modulus G' values.

Example 7

A mixture of polydimethylsiloxane polymer (15 g), hydroxyl MQ resin (33 g), and heptane (60 g) was stirred at reflux for 2 hours, with N$_2$ gas blanket. Catalyst nBuLi (0.3 mL, 1.6M in hexane) was added and the mixture was mixed for an additional one hour. The reaction mixture was purged with CO$_2$ for 1 hour, followed by N$_2$ for 1 hour. The product was cooled to room temperature and packed in a glass jar.

Examples 8-15

Examples 8-15 were made by combining additional components to Example 7, as set forth in Table 2.

TABLE 2

| Examples | 7 | 8 | 9 | 10 | 11 | 12 | 13 | 14 | 15 |
|---|---|---|---|---|---|---|---|---|---|
| Components | | | | | | | | | |
| Example 7, g | 10 | 10 | 10 | 10 | 10 | 10 | 10 | 10 | 10 |
| PDMS-DA, g | NA | 2.5 | 2.5 | 2.5 | 2.5 | 2.5 | 3 | 3 | 3 |
| MQ, g | NA | 2.5 | 3.5 | 5.5 | 7.0 | 8.5 | 0 | 1 | 2.5 |
| Elastomer 50N, g | NA | 0 | 0 | 0 | 0 | 0 | 1 | 0 | 0 |
| TPO$^d$, g | NA | 0.05 | 0.05 | 0.05 | 0.05 | 0.05 | 0.05 | 0.05 | 0.05 |
| Properties | | | | | | | | | |
| T-Peel, oz/in | | 27 | 24 | 29 | 31 | 33 | 31 | 15 | 22 | 31 |
| G', ×10$^5$ dyn/cm$^2$, −40° C. | 6490 | 6740 | 7320 | 7940 | 9050 | 9940 | 430 | 1380 | 3990 |
| G', ×10$^5$ dyn/cm$^2$, 20° C. | 670 | 890 | 970 | 1130 | 1280 | 1460 | 8.4 | 24 | 110 |
| G', ×10$^5$ dyn/cm$^2$, 80° C. | 2.8 | 3.1 | 4.1 | 4.6 | 5.4 | 6.1 | 1.8 | 2.7 | 3.2 |

Products from n-butyl lithium reaction have higher T-peel adhesion and less modulus G' variation over the temperature range of −40 to 80° C., compared to the adhesives made with ammonium carbonate catalyst. As shown in Table 3, adding more MQ led to higher T-peel and higher shear modulus G'.

Figure 1:
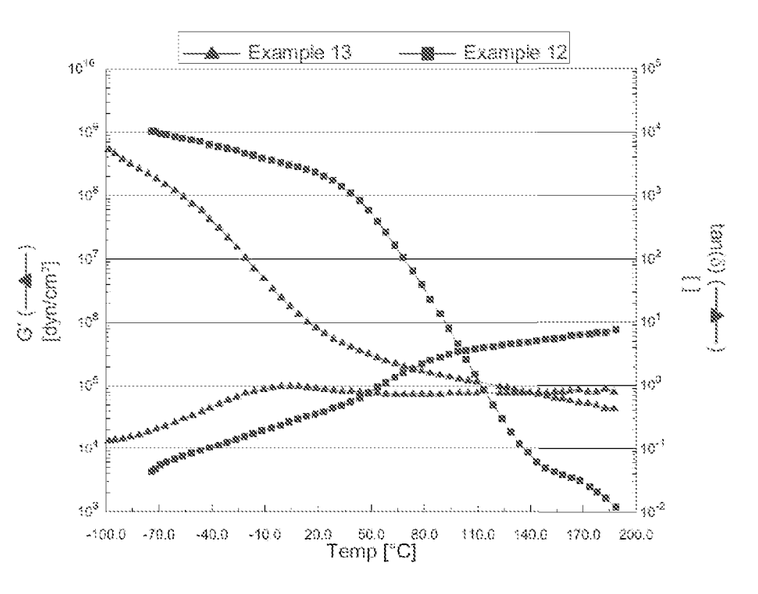
FIG. 1 shows RDA Temperature Sweep (modulus curve verses temperature at Strain <30%, 10 rad/s) of cured silicone pressure sensitive adhesive films.

Example 13-14 have a good balance of T-peel adhesion and low modulus in the entire temperature range of 40 to 80° C., in comparison to Examples 7-12 (FIG. 1). Other mechanical and optical properties are showed in Table 3. The entire RDA temperature sweep tests of Examples 12 and 13 are shown in FIG. 1.

TABLE 3

| Examples | 13 | 14 | 15 |
|---|---|---|---|
| Elongation at break, % | >1500 | >1500 | >1500 |
| 180 Peel at 1 mil, oz/in | 26 | 35 | 50 |
| 180 Peel at 2 mil, oz/in | 41 | 53 | 72 |
| T %, between 1 mm glasses | >99% | >99% | >99% |
| Haze, % | <0.5 | <0.5 | <0.5 |
| b*, % | <0.2 | <0.2 | <0.2 |

Examples 16-17

The reaction conditions for the reacted portion of Example 16 was made similar to Example 1. The reaction portion of Example 17 was made by making a mixture of polydimethylsiloxane polymer (Elastomer 50N, 20 g), hydroxyl MQ resin (30 g), methacryloxypropyldimethoxy terminated polydimethylsiloxane (10 g), KOH solution (1.0N, 0.05 g), and heptane (50 g) was stirred at 60° C. for 2 hr. The reaction mixture was purged with $CO_2$ for 1 hour, and followed by $N_2$ for 1 hour. TPO (0.05 g) was added and mixed for 30 minutes. The product was cooled to room temperature and packed in a glass jar.

TABLE 4

| Examples | 16 | 17 |
|---|---|---|
| Reaction product | | |
| PDMS-DA, g | 31 | 31 |
| MQ, g | 69 | 69 |
| Catalyst, g or mL | $(NH_4)_2CO_3$ 0.3 g | KOH 0.05 g |
| Further combined with | | |
| MQ, g | 10 | 10 |
| PDMS-DA, g | 30 | 30 |
| TPO, g | 0.5 | 0.5 |
| Properties | | |
| T-Peel, oz/in | 2.4 | 20 |
| G', ×10$^5$ dyn/cm$^2$, −40° C. | 1350 | 1210 |

TABLE 4-continued

| Examples | 16 | 17 |
|---|---|---|
| G', ×10$^5$ dyn/cm$^2$, 20° C. | 4.2 | 11 |
| G', ×10$^5$ dyn/cm$^2$, 80° C. | <0.001 | 1.5 |

Example 16 was a weak film with low T-peel and modulus at 80° C. Example 17 had similar T-peel as Example 14, however, it gelled in solution in storage within one week.

Many modifications and variations of this invention can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled.

We claim:

1. A UV-curable silicone pressure sensitive adhesive composition comprising a mixture of:
   (a) 95 to 99.999 wt % of a reaction product in an organic solvent of:
      (i) methacryloxypropyldimethoxy terminated polydimethylsiloxane polymer;
      (ii) hydroxyl functional silicone resin; and
      (iii) a terminal or pendant (meth)acrylate or methoxyl functionalized polydimethylsiloxane polymer or oligomer;
      (iv) an acid or a base catalyst that has a pKa value equal to or less than −6 or equal to or greater than 15;
   (b) 0.001 to 5 wt % of a radical initiator; and
   (c) optionally, a silicone resin or a polydimethylsiloxane polymer or oligomer; and
   wherein the cured adhesive has a transmittance, measured in accordance with ASTM E903 at 500 nm, of greater than 90%; and
   wherein the cured adhesive has a T-peel adhesion of greater than 15 oz/in, measured in accordance with ASTM D1876, between PET substrates; and 180 peel adhesion greater than 25 oz/in, measured in accordance with PSTC 101, between PET and stainless steel panel.

2. The UV-curable silicone pressure sensitive adhesive composition of claim 1, wherein the ratio of the methacryloxypropyldimethoxy terminated polydimethylsiloxane polymer (i) to the hydroxyl functional silicone resin (ii) to the terminal or pendant (meth)acrylate or methoxyl functionalized polydimethylsiloxane polymer or oligomer (iii) ranges from 1-8:1-8:1-8.

3. A UV-curable silicone pressure sensitive adhesive composition of claim 1 in an organic solvent with a percent solids content of 30 to 80 wt %.

4. An article comprising the UV-curable silicone pressure sensitive adhesive composition of claim 1.

* * * * *